(12) United States Patent
Xu

(10) Patent No.: US 7,740,684 B2
(45) Date of Patent: Jun. 22, 2010

(54) METHODS FOR RECOVERING METALS FROM AUTOMOBILE SCRAP AND ELECTRONIC WASTE

(75) Inventor: Kaihua Xu, Shenzhen (CN)

(73) Assignee: Shenzhen Green Eco-Manufacture Hi-Tech Co., Ltd., Shenzhen (CN)

( * ) Notice: Subject to any disclaimer, the term of this patent is extended or adjusted under 35 U.S.C. 154(b) by 0 days.

(21) Appl. No.: 12/122,763

(22) Filed: May 19, 2008

(65) Prior Publication Data

US 2008/0282844 A1    Nov. 20, 2008

Related U.S. Application Data

(63) Continuation of application No. PCT/CN2005/002382, filed on Dec. 30, 2005.

(30) Foreign Application Priority Data

Nov. 17, 2005    (CN) .................... 2005 1 0101387

(51) Int. Cl.
C22B 1/00    (2006.01)
C22C 1/00    (2006.01)
B02C 18/00    (2006.01)

(52) U.S. Cl. .................... 75/375; 75/401; 420/590; 241/24.15

(58) Field of Classification Search .................... 75/401, 75/375; 420/590; 241/24.15
See application file for complete search history.

(56) References Cited

U.S. PATENT DOCUMENTS

| 4,940,486 A | * | 7/1990 | Sommerville et al. ...... 75/10.19 |
| 5,238,489 A | * | 8/1993 | Lyman et al. .................. 75/743 |
| 2004/0089102 A1 | * | 5/2004 | Goldmann et al. ............ 75/401 |

OTHER PUBLICATIONS

Bittence, John C. (Ed). "Recyling Basics" and "Introduction" on the website titled "Recyling." copyright ASM International 2002. http://products.asminternational.org/hbk/do/highlight/content/MH/D34/A01/.html downloaded May 1, 2009.*
"Publication Information and Contributors" on the website titled "Publication Information and Contributors." Copyright 2002 ASM International. http://products.asminternational.org/hbk/do/highlight/content/MH/D00/A00/index.html downloaded Nov. 19, 2009.*

* cited by examiner

Primary Examiner—Gerge Wyszomierski
Assistant Examiner—Tima M McGuthry-Banks
(74) Attorney, Agent, or Firm—Matthias Scholl P.C.; Matthias Scholl

(57) ABSTRACT

A method of recovering the metal from automobile scrap and electronic waste. It includes separating the automobile scrap and the electronic waste to provide some metal pieces, washing and/or shredding and/or selecting said metal pieces to provide some groups of metal pieces having the same metal element, making a full-elemental analysis, comparing the weight of different metal pieces having the same metal element and attaining different combinations of value, weighted averaging the combination of value to calculate the full-elemental weighted average according to the different combinations of value, comparing the different full-elemental weighted averaging to different composite material, and finding a optimal set or some optimal sets, further disposing metal pieces according to the optimal set, and manufacturing alloy. Present invention has a lot of advantages, such as reducing pollution and cost, and processing more waste.

3 Claims, 1 Drawing Sheet

METHODS FOR RECOVERING METALS FROM AUTOMOBILE SCRAP AND ELECTRONIC WASTE

CROSS-REFERENCE TO RELATED APPLICATIONS

This application is a continuation of International Patent Application No. PCT/CN2005/002382 with an international filing date of Dec. 30, 2005, designating the United States, now pending, and further claims priority benefits to Chinese Patent Application No. 200510101387.0 filed on Nov. 17, 2005, the contents of these specifications are incorporated herein by reference

FIELD OF THE INVENTION

The invention relates to environment protection and resource recycling, and more particularly to a method for recycling automobile and electronic waste metals.

BACKGROUND OF THE INVENTION

With the development of human civilization, greater number of electromechanical products is used. Various electromechanical products greatly enhance original functions of our movement, senses, and thinking. Moreover, with fast advancement of the world economy, different electromechanical products undergo increasingly fast updating, and many old electromechanical products are rapidly replaced by new products with better functions and higher performance to price ratio. Among these, automobiles and electronic devices are two types of products with the highest replacement speed and replacement rate.

Electronic devices comprise office automation devices, television receivers, computers, air conditioners, washing machines, refrigerators, computer motherboards, video recorders, mini sound devices, radios/recorders, vacuum cleaners, wind machines, mobile phones, electric heaters, and so on. Metal materials exist more or less all electronic devices, and realize certain electronic/electric functions, such as metal circuits in printed circuit boards, alone or in combination with rubber materials. However, a large number of waste metal materials generated by updating, repairing or failure of the electronic devices enter the environment, and have largely become waste.

There are many metal materials in automobiles. In one aspect, metal materials alone or in combination with rubber materials implement particular functions. In another aspect, people have increasingly high requirements for automobile performance such as safety, maneuverability, comfortableness and so on. Accordingly, automobiles have more and more electronic devices containing various metal materials.

If discarded automobiles and electronic waste are piled up in the open air or simply processed, metal waste will be converted into three types of wastes: liquid waste, gaseous waste, and solid waste. All of these are difficult for the environment to eliminate and generate secondary pollution and increasingly severe trouble.

If effective recycling and reusing can be performed on metal in wastes of automobiles and home appliances, environment burden or pollution will be greatly decreased or improved, and a new type of material resources will be formed.

Nowadays, a popular method for recycling metal wastes in automobiles and electronic devices employs separation and purification technologies. This recycling method is based on early industrial material concepts and traditional industrial processes, and is impeccable from a theoretical perspective since the purification technology of metal elements is more mature and easier to implement than a purification and separation technology of polymers.

However, with fast development of industrial facilities in urban and rural regions, problems occur regardless of whether a dry purification process or a wet purification process are used. For example, the dry purification process mainly employs high temperature melting, which is of high energy consumption, high treatment cost and non-neglectable heat pollution. Wet purification mainly employs strong acid and strong oxidant, which easily cause secondary pollution while extracting residual liquid and features bad operation condition in factories.

To summarize, since the traditional treatment methods cannot guarantee comparatively low treatment cost and good environmental benefit and cause bad treatment/utilization effect, high cost and poor scale benefit and industrial advantage, such methods are not beneficial to the society and commercial operation is difficult to be enhanced.

In this aspect, China Patent No. 02113059.0 discloses a method for recycling metal, such as platinum, palladium, rhodium and so on, from a waste catalyst of automobile exhaust. The method comprises steps of crushing the waste catalyst, dissolving it via inorganic acid, ion exchange, separating platinum via ammonium complex formation, extracting palladium via complexation, and separating rhodium with copper powder. It has been reported that this method has a simple technology and a high metal recycling rate: platinum recycling rate >96%, palladium recycling rate >97%, rhodium recycling rate >90%, product purity of platinum, palladium, and rhodium $\geq$99.95%.

However, the above-mentioned method has many disadvantages including secondary pollution of residual liquid, pool operation condition in factories, inability to enhance treatment, and so on.

SUMMARY OF THE INVENTION

In view of the above-described problems, it is one objective of the invention to provide a method for recycling automobile and electronic waste metal. The method features the following advantages: reduced secondary pollution generated during a treating and recycling process, reduced treatment cost, and enhanced range of waste that can be treated.

To achieve the above objectives, in accordance with one embodiment of the invention, provided is a method for recycling automobile and electronic waste metal, comprising: A) separating the automobile and electronic waste to obtain a plurality of separated metal pieces, washing and/or breaking and/or selecting the separated metal pieces to obtain several piles of homogenous metal pieces; B) performing full-elemental analysis on the homogenous metal pieces; C) quantitatively combining weights of the different piles of homogenous metal pieces and obtaining different combinations of weights, and performing weighted averaging of the combinations of weights to calculate the full-elemental weighted average according to the different combinations of weights; D) comparing the full-elemental weighted average of different combination of weights with different alloy grades, so as to find one or more closest types of alloy grades and to set the alloy grades as target alloy grades; E) performing further processing on metal pieces in combination of weights corresponding to the target alloy grades, and producing alloy products or raw materials for metallurgy of the target alloy grades.

The process of the invention makes use of high-speed calculation ability of modem computers, and improves the traditional process by quantitatively combining weights of the different piles of homogenous metal pieces, and comparing various alloy grades therewith so as to select certain virtual combinations and to implement corresponding processes. Using the virtual combinations and selection, it is possible to reduce a separation and a purification process featuring high energy consumption and secondary pollution. The process difficulty, the energy waste, and the pollution of the metal adding operation are all greatly superior to the separation process, so, using this method to select alloy types and processes of the virtual combinations, it is possible to reduce or eliminate the separation and purification process entirely, and to produce required alloy grades or other corresponding materials by merely adding the required metal elements or alloy materials. Therefore, the method of the present invention can reduce secondary pollution generated by the treating and recycling processes and the treatment cost and can extend the range of waste that can be treated. The method also improves the benefits of scale and industrial advantage and enhances commercial operation, allowing it to find support from the society, its people and governments.

In order to adapt to different complicated conditions of metal waste and to optimize the above advantages of the method of the invention, improvement of the invention further comprises: in step D, firstly selecting the combination of weight in which no element needs to be removed or the combination of weight in which the least quantity of elements need to be removed.

In step D, setting of the alloy grades comprises sequentially selecting various combination of weights based on the number of elements that need to be removed, and sequentially selecting the combination of weights according to the prospective market price, further processing cost, further processing investment, and price of re-added pure materials For further refine and optimize the above advantages of the method of the invention, improvement of the present invention further comprises: a washing process in step A comprises one or more of water washing, chemical cleaning, and ultrasonic cleaning.

In order to refine and optimize the above advantages, improvement of the present invention further comprises a washing process in step A comprising one or more of water washing, chemical cleaning, and ultrasonic cleaning.

The breaking process in step A comprises cutting and hammering.

The selecting process in step A comprises vibration selection and magnetic selection.

Processing aid and regulating element with appropriately amount are added timely.

The wet smelting process comprises a differential dissolution method and an extraction method, and the dry smelting process comprises plasma high temperature melting.

As a system for recycling automobile and electronic waste metal and implementing processes of the invention, the system comprises a separating device, a breaking device, a sorting device, and a heavy-processing device for metals. The recycling system further comprises an element analysis center and an information center for selecting metal grades. The information center comprises a data processing device comprising a database memory for storing all types of metal grades and a calculation module for weighting and comparing element analysis data. The separating device comprises a worktable with a clamp and an elevator, along with a stack for respectively piling homogenous divided metal pieces.

The data processing device further comprises a data communication module and a data communication interface. The data processing device is connected to external data communication networks via the data communication module and the data communication interface. The data processing device keeps communication with external metal trading markets, metallurgical research institutes, professional colleges, and websites of metallurgy enterprises, and updates the data processing device periodically.

The element analysis center comprises a collection interface for collecting, transmitting, and analyzing data and the reserves of stacks. This collection interface and the data processing device are connected and communicated with each other.

The heavy-processing device for metals comprises a bead machine, a dry smelting device, and a wet smelting device.

The wet smelting device comprises a sedimentary trough for dissolving acid liquid, a cleaning trough, and a press filter. The dry smelting device comprises a sintering furnace for powder metallurgy. The sorting device comprises a vibration grading sifter, a pneumatic sorting machine and/or a flotation machine, and a magnetic sorting machine.

The invention is described in detail below with reference to accompanying drawings and embodiments.

DETAILED DESCRIPTION OF THE INVENTION

Figure 1:
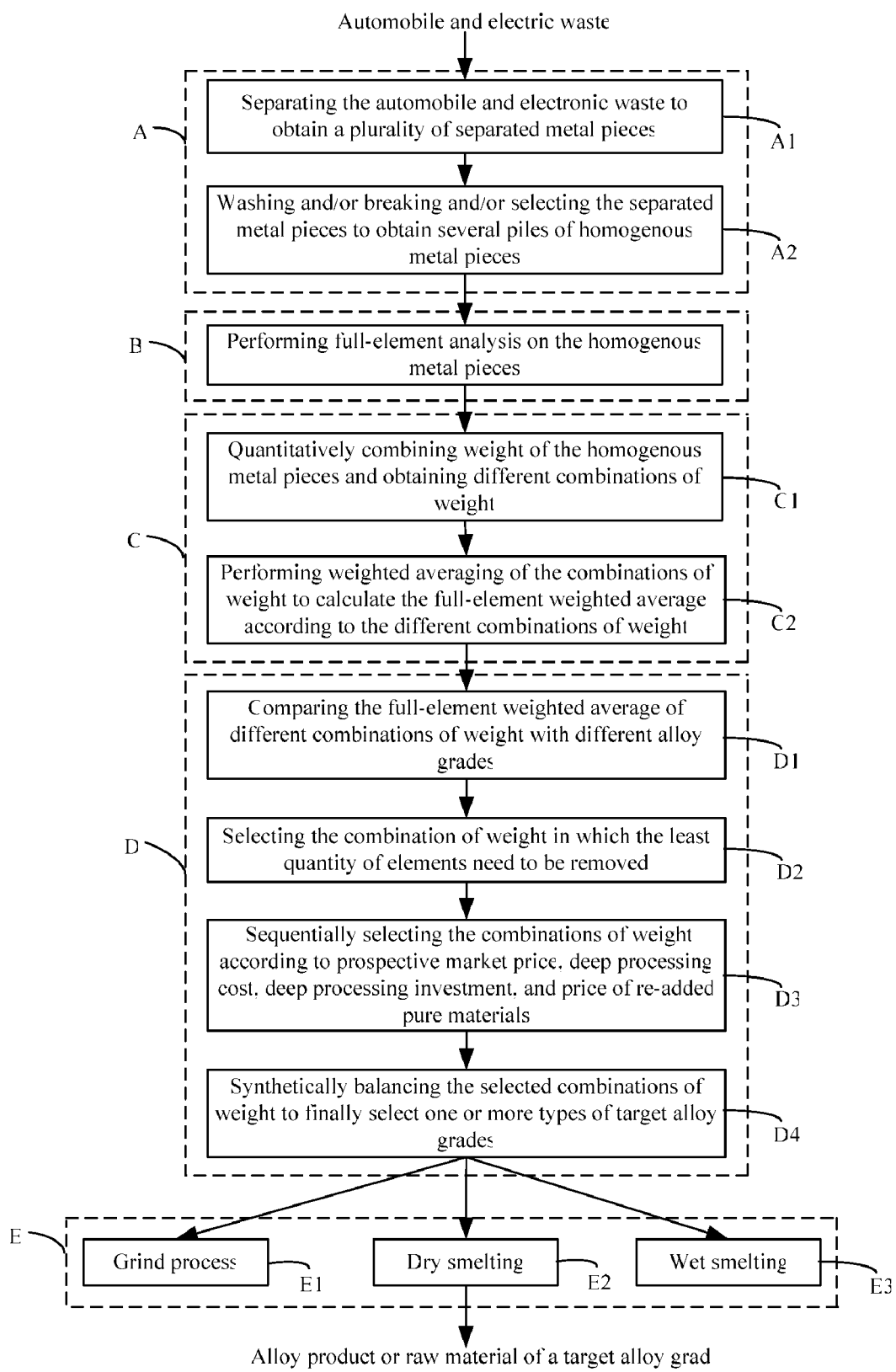
FIG. 1 is a flow chart of a method according to one embodiment of the invention.

FIG. 1 is flowchart of a method for recycling automobile and electronic waste metal of the invention. The method comprises the following steps:

A) in step A1, separating the automobile and electronic waste to obtain a plurality of separated metal pieces; in step A2, washing and/or breaking and/or selecting the separated metal pieces to obtain several piles of homogenous metal pieces, the washing process comprising one or more of water washing, chemical cleaning, and ultrasonic cleaning, the shredding process comprising cutting and hammering, and the selecting process comprising vibration selection and magnetic selection;

B) performing full-elemental analysis on the homogenous metal pieces;

C) in step C1, quantitatively combining weights of the different piles of homogenous metal pieces and obtaining different combinations of weights, in step C2, performing weighted averaging of the combinations of weightss to calculate the full-elemental weighted average according to the different combinations of weights;

D) in step D1, comparing the full-elemental weighted average of different possible combination of weights with different alloy grades; in step D2, firstly selecting the combination of weight in which no element needs to be removed or the combination of weight in which the least quantity of elements need to be removed, and then sequentially selecting various combinations of weights based on the number of elements that need to be removed; in step D3, sequentially selecting the combinations of weights according to prospective market price, further processing cost, further processing investment, and price of re-added pure materials; and in step D4, synthetically balancing the selected combinations of weights to finally select one or more types of target alloy grades; and E) performing further processing on metal pieces in combinations of weights corresponding to the target alloy grades, and producing alloy products or raw materials for metallurgy of the target alloy grades, the further processing comprising one or more of a grinding process E1, a dry smelting process E2, and a wet smelting process E3; the wet smelting process E3 comprises a differential dissolution method and an extraction method; and in the process of the dry smelting method and/or the wet smelting method, processing aid and regulating element with appropriately amount are added timely.

Example 1 of Recycling Method

The automobile and electronic waste is separated to obtain divided metal pieces, each comprising a body outer panel, a steel shell, a heat sink, pins of an electronic component, and solders. By performing washing, magnetic selection and primary chemical analysis on the divided metal pieces, some piles of homogenous metal pieces are obtained. After full-elemental analysis is performed on the homogenous metal pieces, the following results are obtained: accumulative weight of the body outer panel and the steel shell containing Fe≧99.0% is 800 kg; accumulative weight of the heat sinks containing Al≧99.9% is 400 kg; weight of the two homogenous metal pieces are quantitatively combined and different combinations of weights are obtained; weighted averaging of the combinations of weights is performed to calculate the full-elemental weighted average according to the different combinations of weights; the full-elemental weighted average of different combinations of weights are dynamically compared with different alloy grades; firstly the combination of weight in which no element needs to be removed or the combination of weight in which the least quantity of elements need to be removed is selected, and then various combinations of weights are sequentially selecting based on the number of elements that need to be removed; and finally a target alloy grade FeAl34Ba6Si18, in which Si≧18, Al≧34, Ba≧6, and Fe=42 is selected. The target alloy grade is a Si—Ba—Al—Fe alloy, which is a new deoxidizer and desulfurizer with good deoxidation and desulphurizing capability, plays an important role in changing distribution of inclusions in steel, refining grain and improving processability and quality of steel, and especially meets deoxidation requirement for continuous casting steel and killed liquid steel. Compared with a single alloy such as a pure aluminum alloy and a ferrosilicon alloy, the Si—Ba—Al—Fe alloy has significant effect improving deoxidation rate by 10% and reducing metallic inclusion by 29%.

According to the target alloy grades, further processing of the metal pieces corresponding to the combinations of weights can implemented by adding proper metal Si and Ba without performing purifying and separating processing on the body outer panels, the steel shells and the heat sinks. Additional, further processing can be implemented by grinding the 494 kg body outer panels and the steel shells and the 400 kg heat sinks, then sending them to a factory for dry smelting or wet smelting by adding proper amounts of Si and Ba, or the processing of adding Si and Ba can be done in the factory, so as to produce alloy products of the target alloy grades.

Example 2 of Recycling Method

The automobile and electronic waste is separated to obtain divided metal pieces, each comprising a body outer panel, a steel shell, a heat sink, pins of an electronic component, and solders. By performing washing, magnetic selection and primary chemical analysis on the divided metal pieces, some piles of homogenous metal pieces are obtained. After full-elemental analysis is performed on the homogenous metal pieces, the following results are obtained: accumulative weight of the pins and the copper wires containing Cu≧99.9% is 400 kg; accumulative weight of tin solders by welding-off recycling Sn≧99.9% is 50 kg; weight of the two homogenous metal pieces are quantitatively combined and different combinations of weights are obtained; weighted averaging of the combinations of weights is performed to calculate the full-elemental weighted average according to the different combinations of weights; the full-elemental weighted average of different combinations of weights are dynamically compared with different alloy grades; firstly the combination of weight in which no element needs to be removed or the combination of weight in which the least quantity of elements need to be removed is selected, and then various combinations of weights are sequentially selecting based on the number of elements that need to be removed; and finally the target alloy grade Sn BRONZE 6.5-0.1 (QSn6.5-0.1) is selected, in which 6.5±0.5% Sn, and rest is Cu. Proper trace elements are required to be added.

According to the target alloy grades, further processing of the metal pieces corresponding to the combinations of weights can implemented by adding proper trace elements without performing purifying and separating processing on the pins, the copper wires and solders. Additional, further processing can be implemented by grinding on the 400 kg pins and copper wires and the 27 kg solders, and thus alloy products of the target alloy grades are produced.

INDUSTRIAL APPLICATION

The above-mentioned system for recycling automobile and electronic waste metal can effectively implement processing and operation of the invention, and high-efficiently recycles automobile and electronic waste metal.

What is claimed is:

1. A method for recycling waste, comprising:
   A) separating waste into a plurality homogeneous piles of metal pieces and determining the weight of each homogeneous pile;
   B) performing elemental analysis to estimate fractions of metal elements in each homogeneous pile;
   C) based on said fractions of metal elements in each homogeneous pile and the weight of each pile, calculating a plurality of possible weight combinations of metal pieces from said homogeneous piles and calculating a corresponding fraction of metal elements for each possible weight combination of metal pieces from said homogeneous piles;
   D) comparing the fraction of metal elements for each possible weight combination against a database of fractions of metal elements of known alloy grades to select one or more closest types of alloy grades and to select the alloy grades as target alloy grades, said target alloy grades corresponding to one or more selected weight combinations of metal pieces from said homogeneous piles; and E) producing alloy products based on said target alloy grades by combining metal pieces from said homogeneous piles according to said selected weight combinations of metal pieces from said homogeneous piles.

2. The method claim 1, wherein in step D, selecting alloy grades for which no element needs to be removed or selecting alloy grades for which the lowest quantity of elements needs to be removed.

3. The method of claim 1, wherein in step D, selecting alloy grades comprises sequentially selecting various combinations of weights based on the number of elements that needs to be removed, and sequentially selecting the combinations of weights according to prospective market price, further processing cost, further processing investment, and/or price of re-added pure materials.

* * * * *